(12) United States Patent
Ye et al.

(10) Patent No.: US 9,505,592 B2
(45) Date of Patent: Nov. 29, 2016

(54) ADJUSTMENT AND TESTING DEVICE FOR A LOAD-LIMITING HOIST

(71) Applicant: ZHEJIANG SHUANGNIAO MACHINERY CO., LTD., Shengzhou, Zhejiang Province (CN)

(72) Inventors: Xiaojiang Ye, Shengzhou (CN); Chungang Zhu, Shengzhou (CN); Xiaming Yu, Shengzhou (CN)

(73) Assignee: ZHEJIANG SHUANGNIAO MACHINERY CO., LTD., Shengzhou, Zhejiang Province (CN)

( * ) Notice: Subject to any disclaimer, the term of this patent is extended or adjusted under 35 U.S.C. 154(b) by 3 days.

(21) Appl. No.: 14/722,017

(22) Filed: May 26, 2015

(65) Prior Publication Data
US 2016/0229673 A1 Aug. 11, 2016

(30) Foreign Application Priority Data

Feb. 7, 2015 (CN) .......................... 2015 1 0066628

(51) Int. Cl.
| | | |
|---|---|---|
| *F04D 15/00* | (2006.01) | |
| *H02K 7/14* | (2006.01) | |
| *B66D 1/56* | (2006.01) | |
| *G01L 3/02* | (2006.01) | |
| *H02P 27/06* | (2006.01) | |

(52) U.S. Cl.
CPC . *B66D 1/56* (2013.01); *G01L 3/02* (2013.01); *H02P 27/06* (2013.01)

(58) Field of Classification Search
CPC ............ B66D 1/56; G01L 3/02; H02P 27/06
USPC ............................................................. 318/3
See application file for complete search history.

(56) References Cited

U.S. PATENT DOCUMENTS 4,272,706 A * 6/1981 Somerville ............ B66D 1/505
318/6
5,385,042 A * 1/1995 La Belle ........... G01M 17/0072
73/116.06

(Continued)

*Primary Examiner* — Erick Glass
(74) *Attorney, Agent, or Firm* — Jiwen Chen

(57) ABSTRACT

An adjustment and testing device for a load-limiting hoist is disclosed, comprising a frame, a variable frequency motor reducing mechanism, an adjusting turntable operating mechanism and an electric control system. The variable frequency motor reducing mechanism comprises a reducing motor and a torque sensor. The torque sensor is connected with a transmission shaft. The upper end of the transmission shaft is connected with a driving shaft. The driving shaft is connected with a driving wheel. The driving wheel is connected with a driven wheel. The driven wheel is internally connected with a driven shaft. The upper end of the driven wheel is connected with a turntable. The upper end of the turntable is equipped with a load limiter member. The adjusting turntable operating mechanism comprises a locking device, a quick safety block and an adjusting spanner. The electric control system comprises a tool kit, an inverter and a time relay. The tool kit is internally provided with a dynamometer controller and a frequency-to-voltage converter. The present invention overcomes the defects of traditional debugging methods. The debugging device consists of a set of special torque sensors and electric control mechanism, with operational convenience and high working efficiency. Due to low test error, the test result is more accurate.

10 Claims, 9 Drawing Sheets

(56) References Cited

U.S. PATENT DOCUMENTS 6,496,766 B1* 12/2002 Bernold ............... B66C 15/065
212/276

2007/0274427 A1* 11/2007 Jullien .................... B66D 1/58
376/268
2016/0024755 A1* 1/2016 Kobiki ................... F16H 61/02
477/52

* cited by examiner

ADJUSTMENT AND TESTING DEVICE FOR A LOAD-LIMITING HOIST

BACKGROUND OF THE INVENTION

1. Technical Field

The present invention relates to a debugging device, in particular to a debugging device of a hoist load limiter.

2. Description of Related Art

At present, the load limiter debugging method of manual hoists is trail hoisting debugging after the whole device is installed and secured on a trail hoisting device. Testing and debugging cannot proceed at the same time. Each time, the testing operation proceeds only when the debugging of the load limiter stops, and the process is complicated.

The principle of the load limiter of the manual hoist is as follows: the maximum friction force of the friction pair is equal to the sliding friction force $F=\mu N$. $\mu$ is the friction coefficient, determined by the surface state of two contact surfaces; N is a pressure applied on the friction face. In actual application, the pressing block in the load limiter and the friction plate are fixed, which means that u is determined. At this time, the friction force is adjusted by adjusting the pressure between the pressing block in the friction pair and the friction plate. The value of the friction force is the maximum limited load when the hoist works.

It manual lifting/manual spanning hoist is used as an example. According to the technical requirements, the load limiting force shall be equal to an external force applied by the gravity of an object with a weight of 1.3-1.6 t, namely when an external force of $1.3 \times 10^4$ N is loaded, the hoist can smoothly perform the lifting operation while the load limiter does not slide and the friction force does not generate sliding friction; when an external force over $1.6 \times 10^4$ N is loaded, the load limiter slides and the friction pair generates sliding friction when the hoist performs the lifting operation.

The debugging operation is as follows: suspend the lifting hook on the hoist on a firm beam and connect the lower hook to a hydraulic cylinder with adjustable pulling force. When the hoist performs lifting, the pulling force of the hydraulic cylinder increases gradually. Observe the working situation of the load limiter when the pulling force reaches $1.6 \times 10^4$ N. If the load limiter slides when the pulling force does not reach $1.6 \times 10^4$ N, stop the lifting operation of the hoist and fasten the self-locking nut of the load limiter. Repeat the above operations and fasten or loosen the self-locking nut on the load limiter to ensure that the load limiter slides when the load limiting force is just over $1.6 \times 10^4$ N.

In the traditional debugging process, the self-locking nut and the load limiter rotates together, so trail hoisting and regulation of the load limiting force cannot proceed at the same time, and multiple repeated operations are needed, so the efficiency is low. The fastening adjustment of the self-locking nut completely depends on the hand feel of the operator, and the process parameters cannot be effectively controlled, so if the load limiter is adjusted by using the traditional method, the load limiting forces of the load limiters may be a little different, so the quality uniformity is undesirable.

BRIEF SUMMARY OF THE INVENTION

The objective of the present invention is to provide a debugging device of a hoist load limiter, overcoming the defects of the traditional debugging methods. The debugging device consists of a set of special torque sensors and electric control mechanisms, with operation convenience and high working efficiency. Due to low test error, the test result is more accurate.

To solve the above technical problem, the following technical solution is employed.

A debugging device of a hoist load limiter, comprising a frame, a variable frequency motor reducing mechanism, an adjusting turntable operating mechanism and an electric control system, characterized in that, the variable frequency motor reducing mechanism comprises a reducing motor and a torque sensor; the reducing motor and the torque sensor are both installed at the lower end of the frame; the reducing motor and the torque sensor are mutually connected; the torque sensor is connected with a transmission shaft; the upper end of the transmission shaft is connected with a driving shaft; the driving shaft is connected with a driving wheel; the driving wheel is connected with a driven wheel; the driven wheel is internally connected with a driven shaft; the driven shaft is secured on the frame; the upper end of the driven wheel is connected with a turntable; the turntable is connected with the driven shaft; the upper end of the turntable is equipped with a load limiter member; and the load limiter member is connected with the driven shaft. The adjustable turntable operating mechanism comprises a locking device, a quick safety block and an adjustable spanner; the locking device is connected with the load limiter member; the quick safety block is connected with the locking device; the adjusting spanner is matched with the load limiter member. The electric control system comprises a tool kit, an inverter and a time relay; the inverter is disposed at the fame; the inverter is matched with the reducing motor; the time relay is disposed at the frame; the time relay is matched with the reducing motor; the tool kit is disposed at the upper end of the frame; and the tool kit is internally provided with a dynamometer controller and a frequency-to-voltage converter. One end of the frequency-to-voltage converter is connected with the torque sensor, and the other end of the frequency-to-voltage converter is connected with the dynamometer controller. The reducing motor is a power output unit. The transmission shaft, a driving shaft, a driven wheel, a driven wheel and a driven shaft constitute a transmission device. When the transmission device is working, the turntable is driven to rotate such that the load limiter member is in the rotating state, which is simple to realize, easy to operate and greatly reduces the labor intensity of the work. The turntable can meet the running-in and debugging of the load limiter members of manual hoists of different tons, so the service scope is wider. The locking device is limited at the position of the load limiter member, avoiding problems such as sliding during debugging. The adjusting spanner can adjust the revolving speed and torque of the load limiter member and coordinate in debugging of the load limiter member, and has a simple structure. The electric control system can cooperate with the torque sensor to detect parameters such as the revolving speed and torque of the reducing motor on the one hand, and on the other hand, can control the whole device. The use is very convenient, and the test result is more accurate than that of the manual debugging.

Furthermore, the lower end of the frame is provided with a location mounting plate; the upper end of the location mounting plate is secured with the reducing motor and the torque sensor; the lower end of the location mounting plate is secured with an output gear and an input gear; the output gear is connected with the reducing motor; the input gear is connected with the torque sensor; and the output gear and the input gear are matched. The location mounting plate plays the securing role, and the input gear and the output gear can be chelated with each other, thus driving the transmission shaft to rotate.

Furthermore, an adjusting bolt is located between the location mounting plate and the frame; and the adjusting bolt is connected with an adjusting nut. The adjusting nut and the adjusting bolt can ensure the verticality and degree of parallelism between the transmission shaft and the bearing base such that the transmission shaft has an axial clearance and the transmission shaft can rotate normally.

Furthermore, the torque sensor is provided with a sensor mounting rack, and the sensor mounting rack is secured at the location mounting plate. The sensor mounting rack is used to secure the torque sensor.

Furthermore, the upper end of the torque sensor is connected with a clutch; the upper end of the clutch shaft is connected with a coupling; and the coupling is connected with the transmission shaft. The clutch shaft brings convenience not only to separation of the torque sensor and the transmission shaft, but also the engagement of the torque sensor and the transmission shaft, ensuring stable engagement and quick and complete separation. The coupling has buffer and damping effects and can improve the axial dynamic performance.

Furthermore, the frame is provided with a test bed faceplate; the test bed faceplate secures the driven shaft; the test bed faceplate is provided with a bearing base; and the bearing base is internally connected with the driven shaft. The test bed faceplate plays a support role, and the bearing base limits the position of the driving shaft, bringing convenience to off tracking.

Furthermore, the outside of the turntable is connected with a coupling plate; the coupling plate is secured with the locking device; and the locking device is equipped with a locating pin. The coupling plate secures the locking device, and the locating pin plays the role of location.

Furthermore, the load limiter member is internally provided with a load limiter adjusting nut, and the load limiter adjusting nut is matched with the adjusting spanner. By adjusting the adjusting number and using the adjusting spanner, the torque and revolution speed can be adjusted.

Furthermore, the frame surface is provided with a power switch, a start switch, a stop switch, an emergency stop switch and a speed adjusting button; the start switch is matched with the inverter; the stop switch is matched with the inverter; and the speed adjusting button is matched with the inverter. The start switch starts the inverter. The stop switch stops the inverter. The power switch can power on or off the whole device. The emergency stop switch can suddenly stop the device in an emergency. The speed adjusting button can adjust the revolving speed of the reducing motor through the inverter.

Furthermore, the tool kit is provided with a reset switch, a revolving speed display window, a torque display window, an output power display, a current window and an instrument power switch; the revolving speed display window is matched with the dynamometer controller; and the torque display window is matched with the dynamometer controller. The revolving speed display window displays the revolving speed of the reducing motor. The torque display window displays the torque of the reducing motor. The output power display displays the output power of the reducing motor. The current window displays the current value.

The above technical solution has the following beneficial effects:

The present invention provides a debugging device of a hoist load limiter, overcoming the defects of traditional debugging methods. The debugging device consists of a set of special torque sensors and electric control mechanism, with operation convenience and high working efficiency. Due to low test error, the test result is more accurate. The present invention has the following beneficial effects:

1. Debugging of the load limiting force of the load limiter member can be implemented alone, saving the operation of the moving the whole manual hoist device and reducing the labor intensity.

2. The load limiting force of the load limiter member can be directly and accurately reflected on the debugging console.

3. The present invention can also realize trail hoisting and debugging at the same time, without complicated start and stop operations. At the same time, the load limiting force can be directly and accurately reflected on the debugging console.

4. A skilled worker with 7-8 years of experience needs 2 min to complete the debugging operation. Using the present invention, it only takes 30 s to complete the debugging work of a load limiter member after simple training.

5. The working efficiency of the debugging operation and the accuracy of the load limiter part are greatly improved and good for control over the quality uniformity and realization of the assembling stability.

The reducing motor is a power output unit. The transmission shaft, a driving shaft, a driving wheel, a driven wheel and a driven shaft constitute a transmission device. When the transmission device is working, the turntable is driven to rotate such that the load limiter member is in the rotating state, which is simple to realize, easy to operate and greatly reduces the labor intensity of the work. The turntable can meet the running-in and debugging of the load limiter members of manual hoists of different tons, so the service scope is wider. The locking device limits the position of the load limiter member, avoiding problems such as sliding during debugging. The adjusting spanner can adjust the revolving speed and torque of the load limiter member and coordinate in the debugging of the load limiter member, and has a simple structure. The electric control system can cooperate with the torque sensor to detect parameters such as the revolving speed and torque of the reducing motor on one hand, and on the other hand, can control the whole device. The use is very convenient, and the test result is more accurate than that of manual debugging.

BRIEF DESCRIPTION OF THE SEVERAL VIEWS OF THE DRAWINGS

The present invention is described in further detail with reference to the attached drawings.

In FIG. 6, SB1 represents an emergency stop switch; SB2 represents a stop switch; and SB3 represents a start switch.

DETAILED DESCRIPTION OF THE INVENTION

Figure 1:
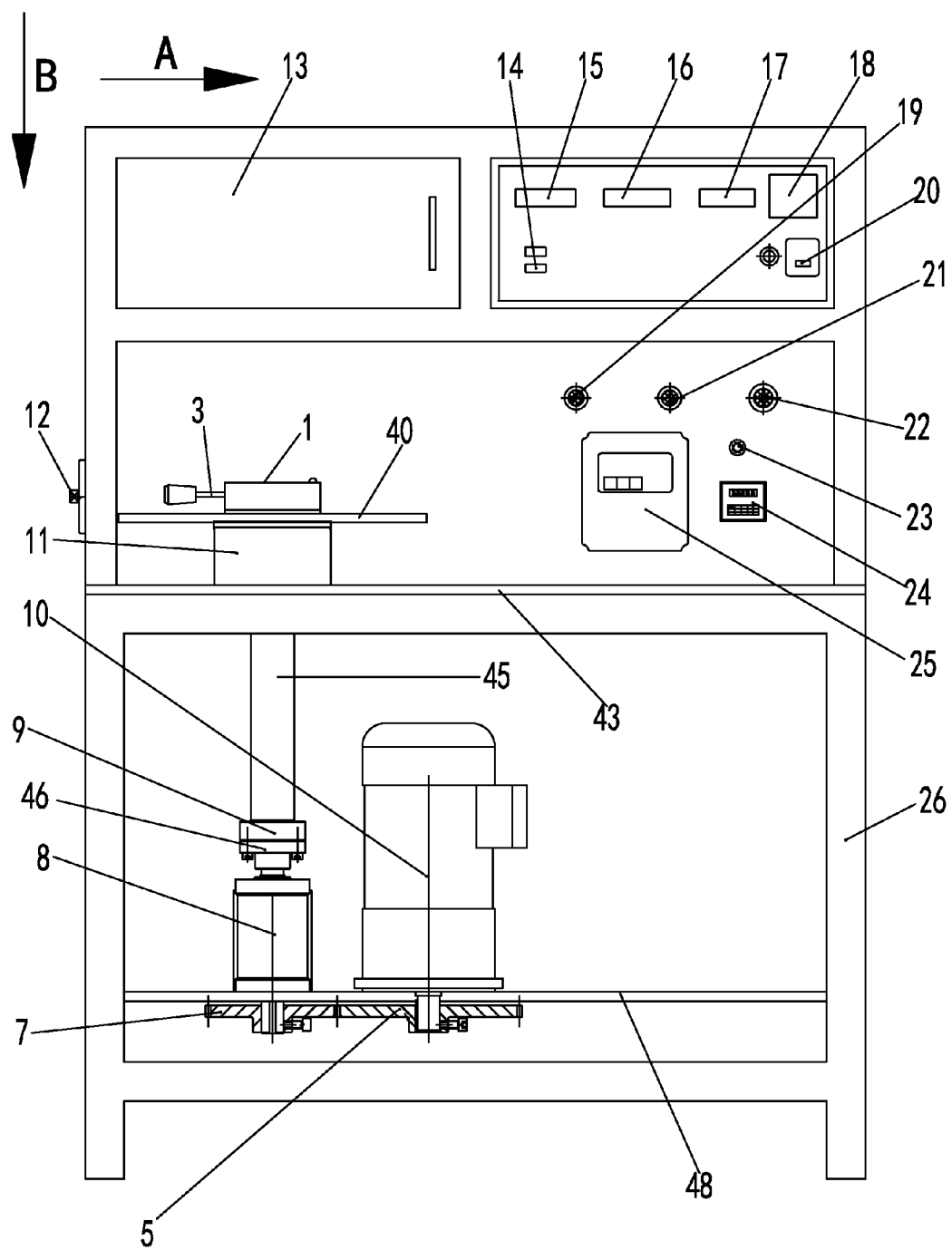
FIG. 1 is a structural view of a debugging device of a hoist load limiter of the present invention.
Figure 2:
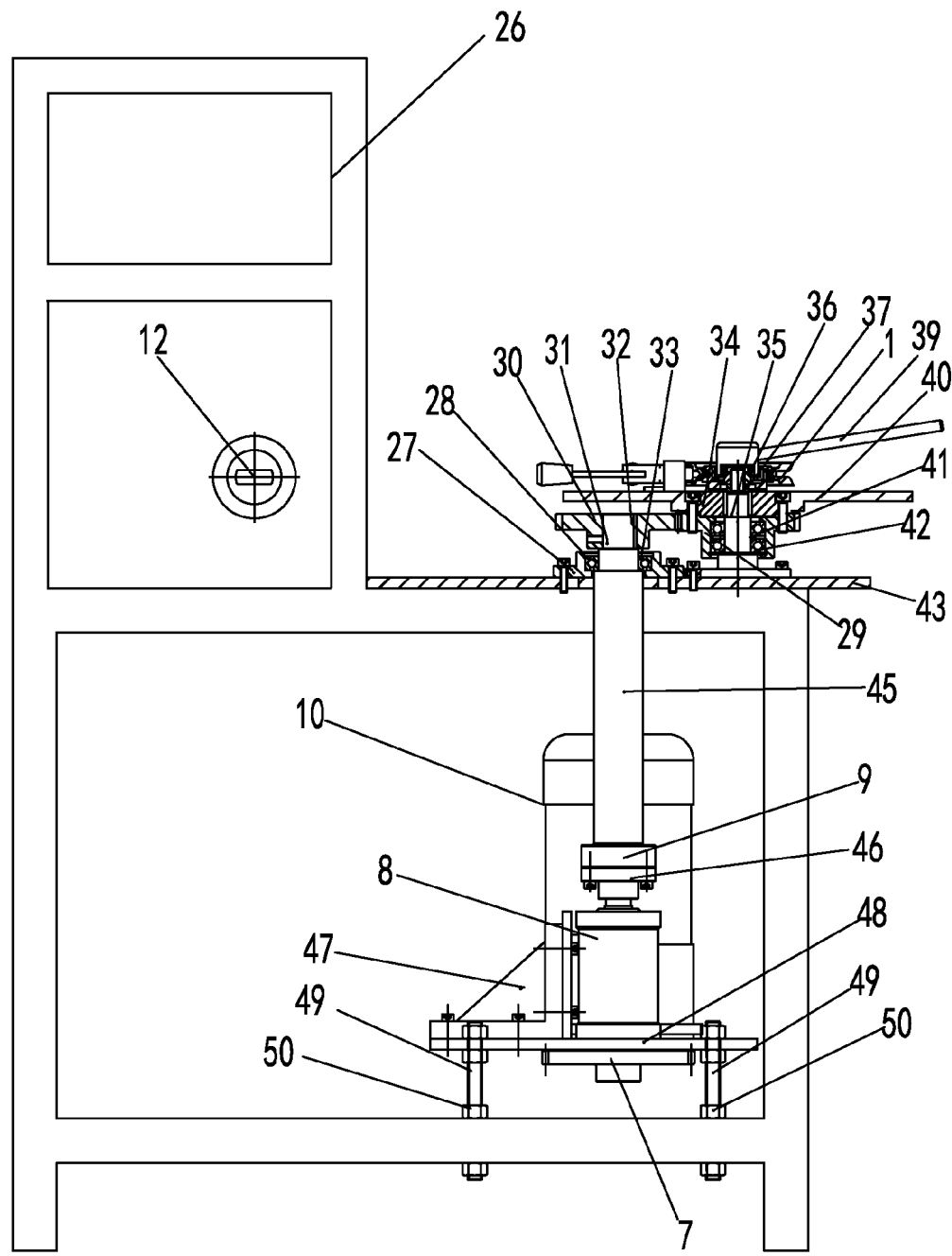
FIG. 2 is a perspective view of FIG. 1 in direction A.
Figure 3:
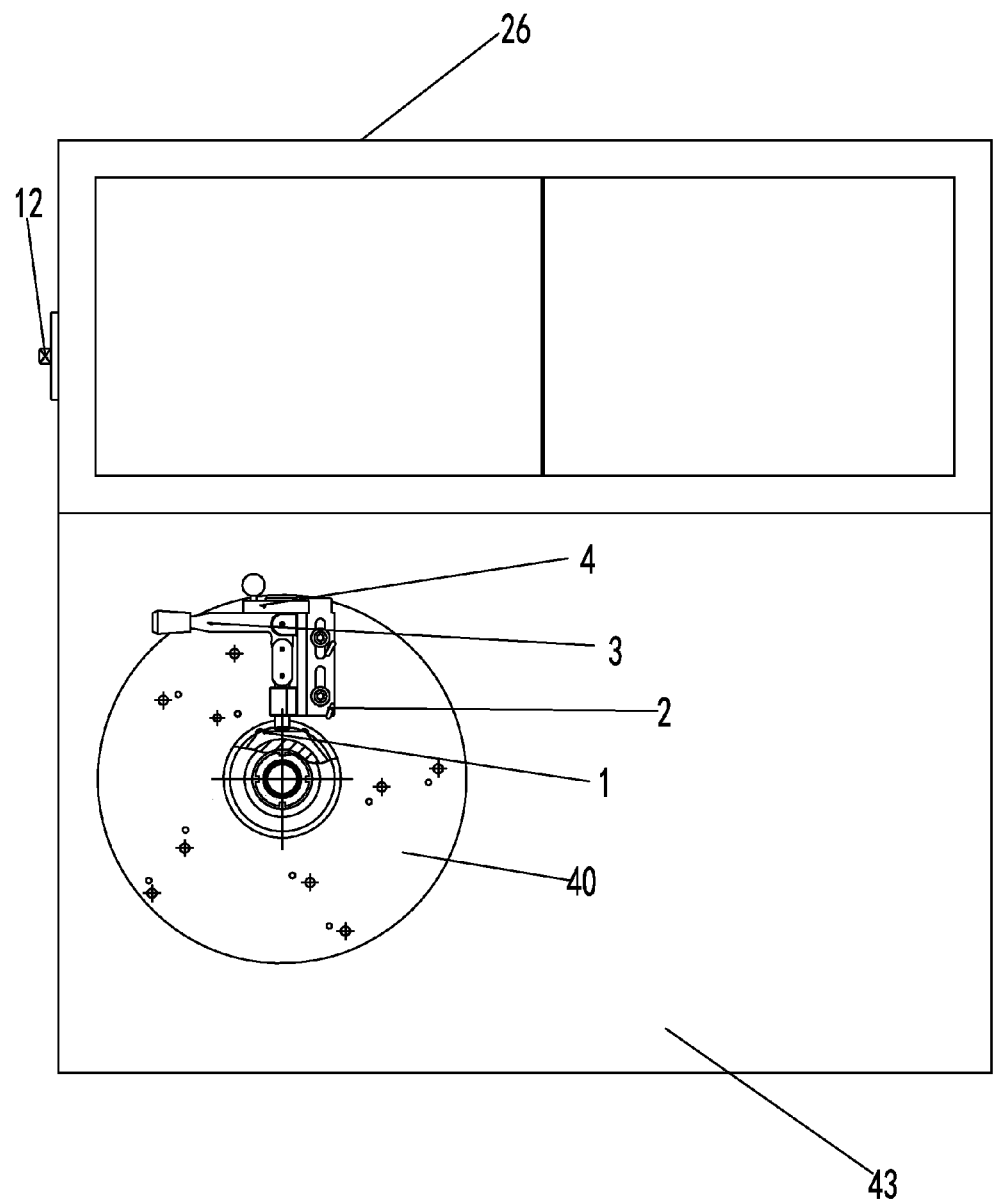
FIG. 3 is a structural view of FIG. 1 in direction B.
Figure 4:
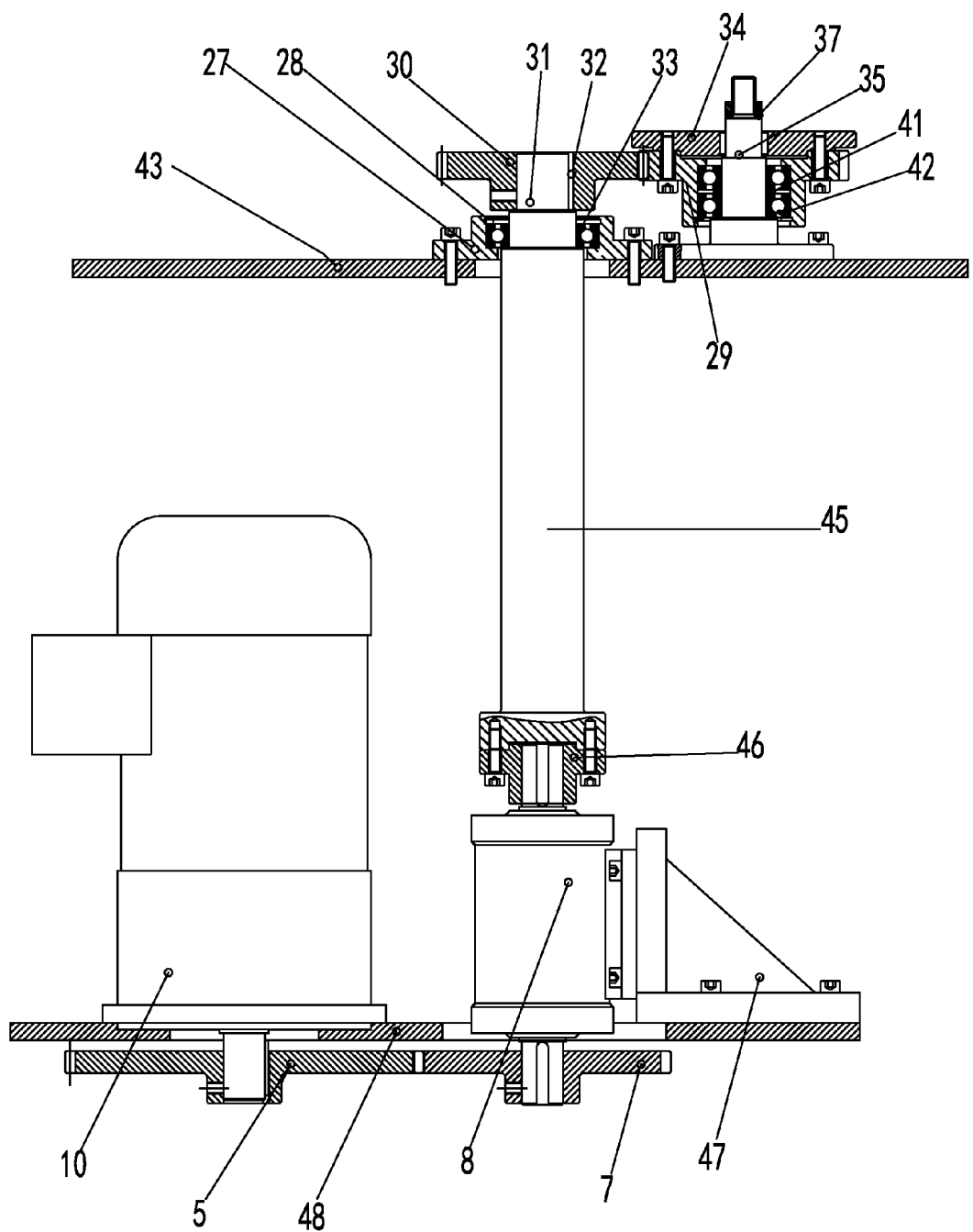
FIG. 4 is an assembling view of a variable frequency motor reducing mechanism in the present invention.
Figure 5:
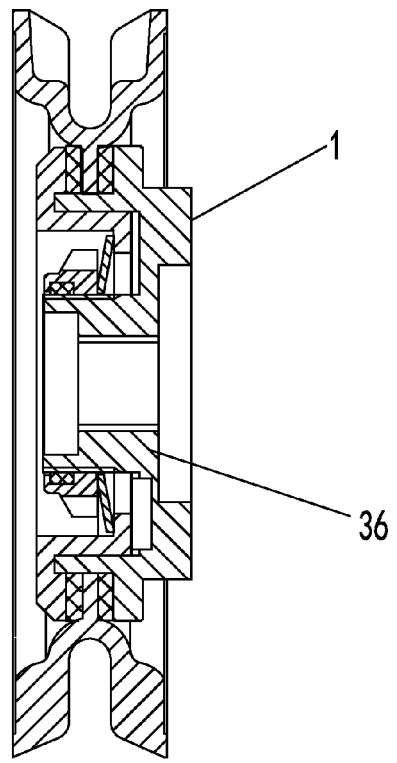
FIG. 5 is a structural view of a load limiter member in the present invention.
Figure 6:
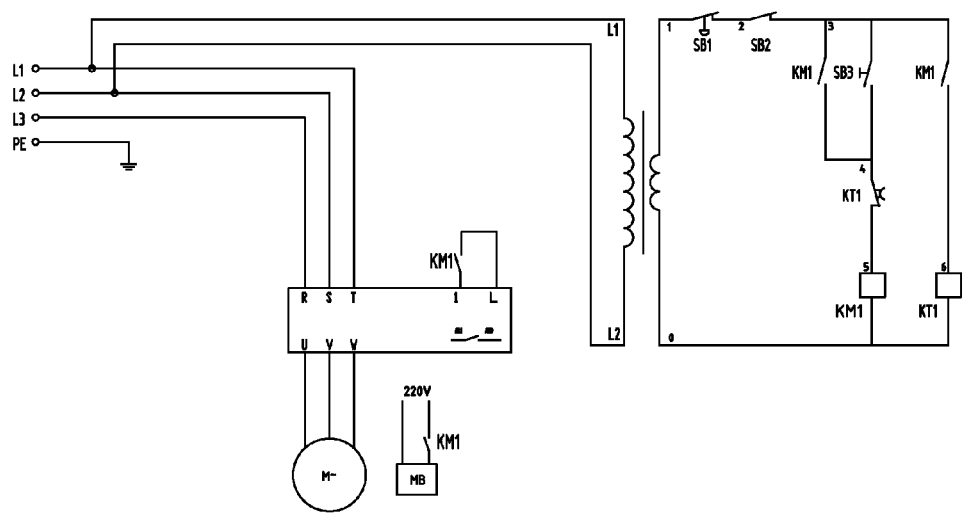
FIG. 6 is a schematic view of the electric control of an inverter in the present invention.
Figure 7:
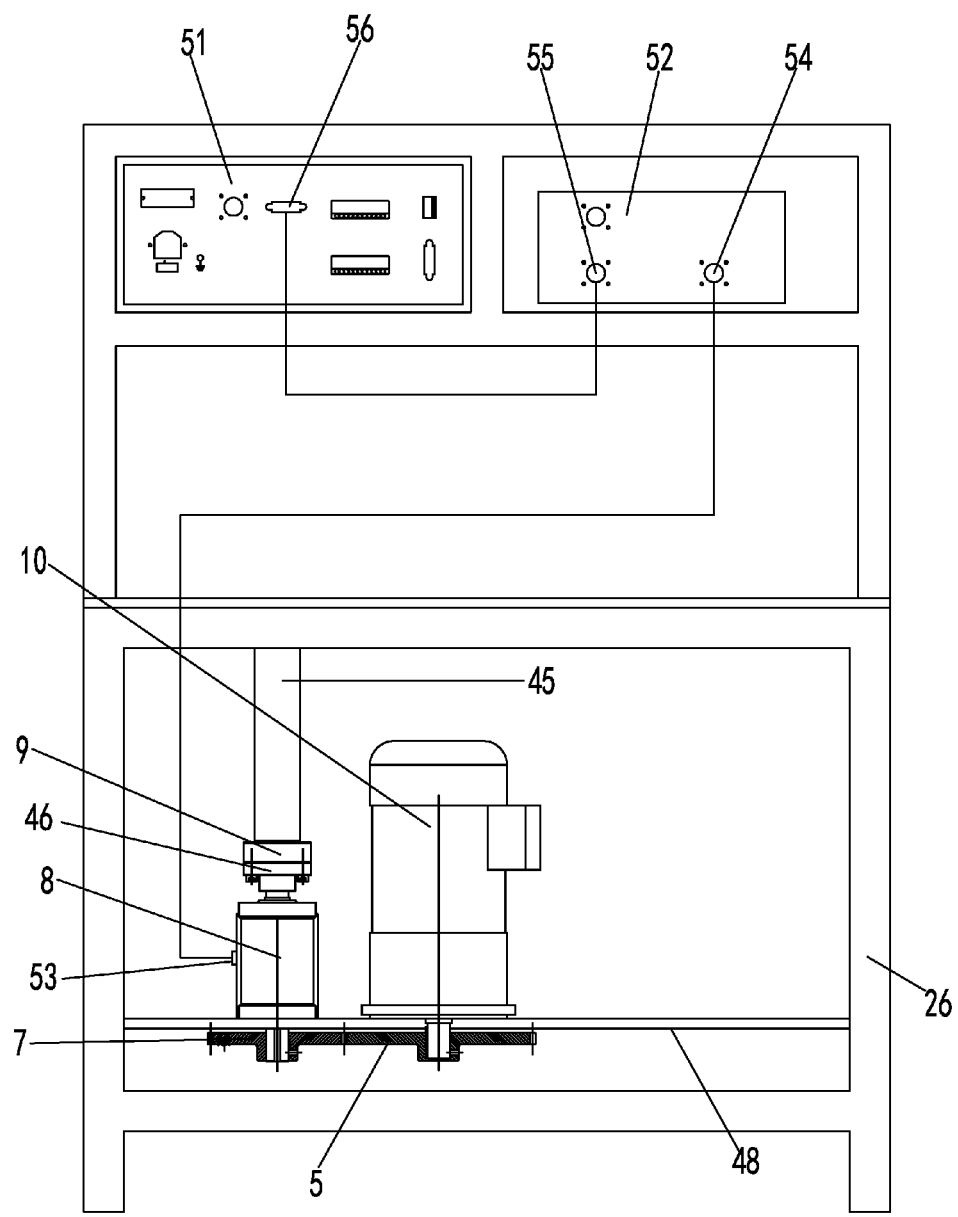
FIG. 7 is a schematic view of testing of the revolving speed and torque of a reducing motor in the present invention.
Figure 8:
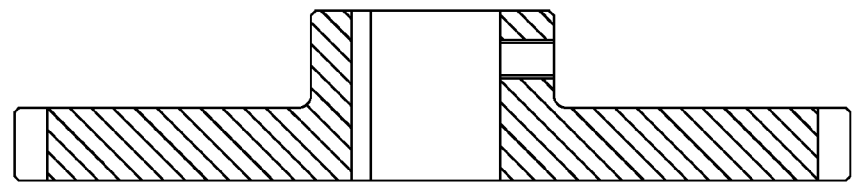
FIG. 8 is a structural view of an input gear of the present invention.
Figure 9:
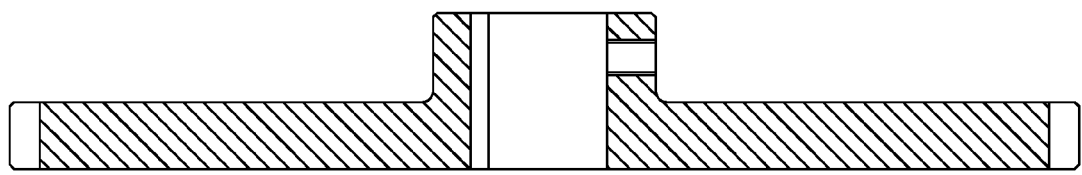
FIG. 9 is a structural view of an output gear of the present invention.
Figure 10:
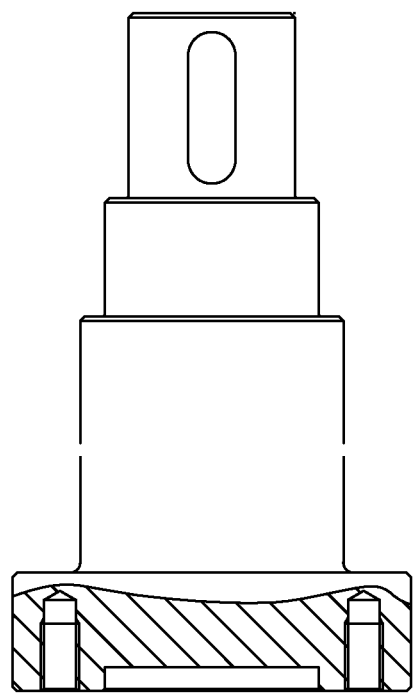
FIG. 10 is a structural view of a driving shaft of the present invention.
Figure 11:
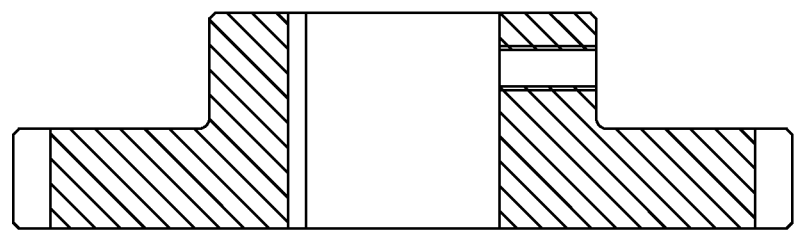
FIG. 11 is a structural view of a driving wheel of the present invention.
Figure 12:
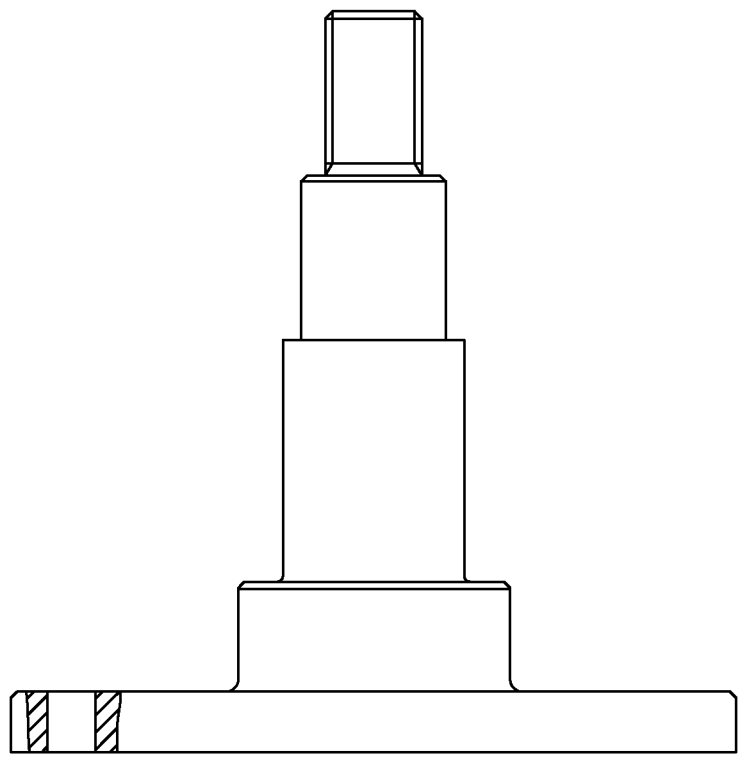
FIG. 12 is a structural view of a driven shaft of the present invention.
Figure 13:
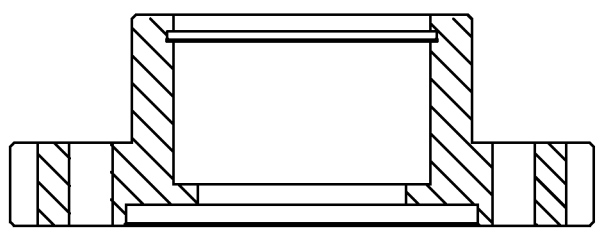
FIG. 13 is a structural view of a driven wheel of the present invention.

As shown in FIGS. 1-13, a debugging device of a hoist load limiter comprises a frame 26, a variable frequency motor reducing mechanism, an adjusting turntable operating mechanism and an electric control system. The frame 26 consists of an upper part and a lower part. The whole frame 26 is L-shaped. In the upper part area, a tool kit 13 and a test bed faceplate 43 are installed, and in the lower part area, a location mounting plate 48 is erected. The variable frequency motor reducing mechanism comprises a reducing motor 10 and a torque sensor 8. The reducing motor 10 and the torque sensor 8 are both installed on the location mounting plate 48, and the torque sensor 8 is secured through a sensor mounting rack 47. After being secured, the torque sensor 8 has high stability, without deviation because of vibration. The lower end of the location mounting plate 48 is equipped with an input gear 7 and an output gear 5. The input gear 7 and the output gear 5 are both provided with gear teeth on the surface and connected through the gear teeth so that output gear 5 can drive the input gear 7 to rotate when rotating. The output gear 5 is connected with the reducing motor 10. The input gear 7 is connected with the torque sensor 8. When the reducing motor 10 starts to work, the revolving speed output by the reducing motor 10 is transmitted to the torque sensor 8 through the output gear 5 and the input gear 7 in turn. The torque sensor 8 is connected with a transmission shaft 45, so the transmission shaft 45 can rotate when driven by the torque sensor 8. Meanwhile, the transmission shaft 45 and the torque sensor 8 are connected through a clutch shaft 46 and a coupling 9; the clutch shaft 46 is connected with the torque sensor 8; and the coupling 9 is connected with the transmission shaft 45. The clutch shaft 46 brings convenience not only to the separation of the torque sensor 8 and the transmission shaft 45, but also the engagement of the torque sensor 8 and the transmission shaft 45, ensuring stable engagement and quick and complete separation. The coupling 9 has buffer and damping effects and can improve the axial dynamic performance. Meanwhile, an adjusting bolt 49 is located between the location mounting plate 48 and the frame 26; and the adjusting bolt 49 is connected with an adjusting nut 50. The adjusting nut 50 and the adjusting nut 49 can ensure the verticality and degree of parallelism between the transmission shaft 45 and the bearing base 27, such that the transmission shaft 45 has an axial clearance and the transmission shaft 45 can rotate normally.

The upper end of the transmission shaft 45 penetrates through the test bed faceplate 43 and is connected with the driving shaft 31. The driving shaft 31 is secured through the bearing base 27. The bearing base 27 is secured at the test bed faceplate 43 through a bolt, so the driving shaft 31 and the transmission shaft 45 can be stably connected. An elastic retainer ring 28 and a first deep groove ball bearing 33 are disposed between the driving shaft 31 and the bearing base 27. The elastic retainer 28 plays a buffering role, reducing the friction loss between the driving shaft 31 and the bearing base 27; the first deep groove ball bearing 33 has a low friction coefficient, a high limiting revolving speed, a simple structure, and ensures the smooth rotation of the driving shaft 31. The driving shaft 31 is connected with the driven wheel 30. During rotation, the transmission shaft 45 transmits the rotary motion state to the driving wheel 30 through the driving shaft 31. A common flat key 32 is disposed between the driving wheel 30 and the driving shaft 31. The common flat key 32 has high centering and high location accuracy, and brings convenience to the dismantling and the assembling of the driving wheel 30 and the driving shaft 31. Furthermore, the driving wheel 30 is connected with the driven wheel 29. The driving wheel 30 and the driven wheel 29 are mutually engaged, so the driving wheel 30 rotates to drive the driven wheel 29 to rotate. The driven wheel 29 is internally connected with the driven shaft 35, and the driven shaft 35 is secured on the test bed faceplate 43 through bolts, so the relative positions of the driven shaft 35 and the test bed faceplate 43 do not change. A second deep groove ball bearing 42 and an isolating sleeve 41 are disposed between the driven shaft 35 and the driven wheel 29; the second deep groove ball bearing 42 has a low friction coefficient, a high limiting revolving speed and a simple structure, ensuring the smooth rotation of the driven shaft 35 and the driven wheel 29; the isolating sleeve 41 plays a buffering role, reducing the friction loss between the driven shaft 35 and the driven wheel 29. The upper end of the driven wheel 29 is connected with a turntable 34. The turntable 34 and the driven wheel 29 are secured through bolting. The turntable 34 and the driven wheel 35 are mutually connected. The upper end of the turntable 34 is equipped with a load limiter member 1. The load limiter member 1 is connected with the driven wheel 35. The load limiter member 1 and the driven shaft 35 are connected with a washer 37 there-between. The washer 37 plays a buffering role, reducing the friction loss between the driven wheel 35 and the load limiter member 1. The working process is as follows: After startup, the reducing motor 10 drives the transmission shaft 45 to rotate, through transmission by the driving wheel 31, the driving wheel 30, the driven shaft 35 and the driven wheel 29, drives the turntable 34 to rotate, and then further drives the load limiter member 1 to go into the rotary state, which is the premise of realizing the debugging of the load limiter member 1. The reducing motor 10 is a power output unit. The transmission shaft 45, the driving shaft 31, the driven wheel 30, the driven wheel 29 and the driven shaft 35 constitute a transmission device. When the transmission device is working, the turntable 34 is driven to rotate such that the load limiter member 1 is in the rotating state, which is simple to realize, easy to operate and greatly reduces the labor intensity of the work. The turntable 34 can meet the running-in and debugging of the load limiter members 1 of the manual hoists of different tons, so the service scope is wider.

The operating mechanism of the adjusting turntable 34 comprises a locking device 3, a quick safety block 4 and an adjusting spanner 39. The outside of the turntable 34 is connected with a coupling plate 40. The coupling plate 40 secures the locking device 3. The locking device 3 can be connected with the load limiter member 1 and is engaged with the load limiter member 1 through the quick safety block 4, avoiding unnecessary displacement. The locking device 3 is equipped with the locking pin 2 and the locking pin 2 is used to limit the degree of freedom of movement of the locking device 3. The load limiter member 1 is internally provided with a load limiter adjusting nut 36, and the load limiter adjusting nut 36 is matched with the adjusting spanner 39. According to the current revolving speed and torque value, the load limiter adjusting nut 36 on the load limiter member 1 can be adjusted through the adjusting spanner 39, and the torque is adjusted to the theoretical torque when sliding. The locking device 3 is limited at the position of the load limiter member 1, avoiding problems such as sliding during debugging. The adjusting spanner 39 can adjust the revolving speed and torque of the load limiter member 1 and coordinate in the debugging of the load limiter member 1, and has a simple structure.

The electric control system comprises a tool kit 13, an inverter 25 and a time relay 24. The tool kit 13, the inverter 25 and the time relay 24 all are disposed on the frame 26. The inverter 25 is used to control the reducing motor 10. The time relay 24 is used to control the rotation time of the reducing motor 10, playing the role of switching on and off at fixed times. The surface of the frame 26 is provided with a power switch 12, a start switch 19, a stop switch 21, an emergency stop 22 and a speed adjusting button 23. The power switch 12 is used to power on or off the whole device. The start switch 19 controls the inverter 25 and can start the inverter 25. The stop switch 21 controls the inverter 25 and can power off the inverter 25. The emergency stop switch 22 can suddenly stop the whole device in an emergency. The speed adjusting button 23 adjusts the operation speed of the reducing motor 10 through the inverter 25. The working principle is as follows: After the power switch 12 is pressed, the whole device is electrified; the inverter 25 is supplied with power and the working time t is set through the time relay 24; after the start switch 19 is pressed, the inverter 25 works and the reducing motor 10 works; after time t, the reducing motor 10 stops working.

The tool kit 13 is internally provided with a dynamometer controller 51 and a frequency-to-voltage converter 52. The frequency-to-voltage converter 52 is provided with a sensor input interface 54 and a torque and revolving speed output interface 55. The dynamometer controller 51 is provided with a torque and revolving speed input interface 56. The torque sensor 8 is provided with a sensor output interface 53. The sensor output interface 53 is connected with the sensor input interface 54. The torque and revolving speed output interface 55 is connected with the torque and revolving speed input interface 56. The working principle is as follows: When the reducing motor 10 is started, the torque sensor 8 feeds back the torque and revolving speed signal, which is transmitted to the frequency-to-voltage converter 52 through the sensor output interface 53 and the sensor input interface 54. The frequency-to-voltage converter 52 converts the signal to an electric signal, which is transmitted to the dynamometer controller 51 through the torque and revolving speed output interface 55 and the torque and revolving speed interface 56. Finally, the dynamometer controller 51 obtains the revolving speed value and torque value of the reducing motor 10. The tool kit 13 is provided with a reset switch 14, a revolving speed display window 15, a torque display window 16, an output power display 17, a current window 18 and an instrument power switch 20; the revolving speed display window 15 is matched with the dynamometer controller 51; and the torque display window 16 is matched with the dynamometer controller 51. The revolving speed display window 15 displays the revolving speed of the reducing motor 10. The torque display window 16 displays the torque of the reducing motor 10. The output power display 17 displays the output power of the reducing motor 10. The current window 18 displays the current value. The power switch 20 is used to switch on or off the dynamometer controller 51 and the frequency-to-voltage converter 52. The electric control system can cooperate with the torque sensor 8 to detect parameters such as the revolving speed and torque of the reducing motor 10 on the one hand, and on the other hand, can control the whole device. The use is very convenient and the test result is more accurate than that of manual debugging.

The operation process of the present invention is as follows:

① Turn on the power switch 12, switch on the dynamometer controller 51, operate the speed adjusting button 23 of the inverter 25 to 10 rpm, place the load limiter member 1 after the rotating speed display window 15, the torque display window 16, the output power display 17 and the current window 18 to get normal signal, press the start switch 19, the load limiter part 1 turns into the rotate state, is connected with the locking device and is fastened with the quick safety block 4.

② According to the value displayed on the torque display window 16, use the adjusting spanner 39 to adjust the load limiter adjusting number 36 on the load limiter member 1 until the torque reading is equal to the theoretical torque value when sliding.

③ Set the time relay 24 to 1-1.5 min, grind and run-in the friction surface of the load limiter member 1.

④ After 1-1.5 min, the reducing motor 10 stops automatically, cool the load limiter member 1 to 2-3 min, and then accurately tune to the regulated torque value.

⑤ Press the stop switch 21, release the quick safety block 4, open the locking device 3, take out the load limiter member 1, and then complete the debugging work of the load limiter member 1.

The above are only specific embodiments of the present invention, but the technical characteristics of the present invention are not limited to the above embodiments. Any simple changes, equivalent substitution or modifications on the basis of the present invention to solve basically the same technical problems and realize basically the same technical effects shall be incorporated into the protective scope of the present invention.

The invention claimed is:

1. A debugging device of a hoist load limiter, comprising a frame, a variable frequency motor reducing mechanism, an adjusting turntable operating mechanism and an electric control system, characterized in that: the variable frequency motor reducing mechanism comprises a reducing motor and a torque sensor; the reducing motor and the torque sensor are both installed at the lower end of the frame; the reducing motor and the torque sensor are mutually connected; the torque sensor is connected with a transmission shaft; the upper end of the transmission shaft is connected with a driving shaft; the driving shaft is connected with a driving wheel; the driving wheel is connected with a driven wheel; the driven wheel is internally connected with a driven shaft; the driven shaft is secured on the frame; the upper end of the driven wheel is connected with a turntable; the turntable is connected with the driven shaft; the upper end of the turntable is equipped with a load limiter member; the load limiter member is connected with the driven shaft; the adjustable turntable operating mechanism comprises a locking device, a quick safety block and an adjustable spanner; the locking device is connected with the load limiter member; the quick safety block is connected with the locking device; the adjusting spanner is matched with the load limiter member; the electric control system comprises a tool kit, an inverter and a time relay; the inverter is disposed at the frame; the inverter is matched with the reducing motor; the tool kit is disposed at the upper end of the frame; the tool kit is internally provided with a dynamometer controller and a frequency-to-voltage converter; one end of the frequency-to-voltage converter is connected with the torque sensor, and the other end of the frequency-to-voltage converter is connected with the dynamometer controller.

2. The debugging device of a hoist load limiter according to claim 1, characterized in that the lower end of the frame is provided with a location mounting plate; the upper end of the location mounting plate is secured with the reducing motor and the torque sensor; the lower end of the location mounting plate is secured with an output gear and an input gear; the output gear is connected with the reducing motor; the input gear is connected with the torque sensor; and the output gear and the input gear are matched.

3. The debugging device of a hoist load limiter according to claim 2, characterized in that an adjusting bolt is located between the location mounting plate and the frame; and the adjusting bolt is connected with an adjusting nut.

4. The debugging device of a hoist load limiter according to claim 2, characterized in that the torque sensor is provided with a sensor mounting rack and the sensor mounting rack is secured at the location mounting plate.

5. The debugging device of a hoist load limiter according to claim 1, characterized in that the upper end of the torque sensor is connected with a clutch; the upper end of the clutch shaft is connected with a coupling; and the coupling is connected with the transmission shaft.

6. The debugging device of a hoist load limiter according to claim 1, characterized in that the frame is provided with a test bed faceplate; the test bed faceplate secures the driven shaft; the test bed faceplate is provided with a bearing base; and the bearing base is internally connected with the driven shaft.

7. The debugging device of a hoist load limiter according to claim 1, characterized in that the outside of the turntable is connected with a coupling plate; the coupling plate is secured with the locking device; and the locking device is equipped with a locating pin.

8. The debugging device of a hoist load limiter according to claim 1, characterized in that the load limiter member is internally provided with a load limiter adjusting nut, and the load limiter adjusting nut is matched with the adjusting spanner.

9. The debugging device of a hoist load limiter according to claim 1, characterized in that the frame surface is provided with a power switch, a start switch, a stop switch, an emergency stop switch and a speed adjustment button; the start switch is matched with the inverter; the stop switch is matched with the inverter; and the speed adjustment button is matched with the inverter.

10. The debugging device of a hoist load limiter according to claim 1, characterized in that the tool kit is provided with a reset switch, a revolving speed display window, a torque display window, an output power display, a current window and an instrument power switch; the revolving speed display window is matched with the dynamometer controller; and the torque display window is matched with the dynamometer controller.

* * * * *